United States Patent [19]
Kalberer et al.

[11] Patent Number: 5,921,507
[45] Date of Patent: Jul. 13, 1999

[54] AIRCRAFT CONTROL YOKE

[75] Inventors: Robert Curtis Kalberer, Boulder; Dan Goor, Colorado Springs, both of Colo.

[73] Assignee: Flight Safety Systems, Inc., Boulder, Colo.

[21] Appl. No.: 08/242,796

[22] Filed: May 16, 1994

[51] Int. Cl.⁶ ................................................. B64C 13/04
[52] U.S. Cl. .......................... 244/234; 280/731; 244/121; 244/118.5
[58] Field of Search .............................. 280/728.1, 728 R, 280/729, 731, 730 R, 730.1, 730 A, 730.2, 287.77; 244/121, 118.5, 234; 74/493, 552

[56] References Cited

U.S. PATENT DOCUMENTS

| T875,019 | 6/1970 | Haddad et al. . | |
|---|---|---|---|
| 2,396,309 | 3/1946 | Wodal | 244/234 |
| 3,218,103 | 11/1965 | Boyce et al. . | |
| 3,836,168 | 9/1974 | Nonaka et al. . | |
| 3,863,521 | 2/1975 | Gatsos et al. . | |
| 4,114,843 | 9/1978 | Robinson | 244/234 |
| 4,508,294 | 4/1985 | Lorch . | |
| 4,531,080 | 7/1985 | Nordström et al. | 244/234 |
| 4,832,287 | 5/1989 | Werjefelt . | |
| 5,190,313 | 3/1993 | Hickling . | |

FOREIGN PATENT DOCUMENTS

| 526388 | 9/1940 | United Kingdom | 244/83 |
|---|---|---|---|
| 546210 | 7/1942 | United Kingdom | 244/83 |

*Primary Examiner*—Andres Kashnikow
*Assistant Examiner*—Tien Dinh
*Attorney, Agent, or Firm*—Francis A. Sirr; Earl C. Hancock

[57] ABSTRACT

An airbag module is positioned relative to an aircraft control yoke or shaft, the airbag being actuated by majority voting sensors that are responsive to acceleration forces upon the aircraft. The aircraft control yoke or control yoke post is constructed to telescope, extend, or move a limited distance toward the pilot as the airbag inflates. The yoke carries telescoping, extendable, or movable handle portions that allow left and right hand pilot grip handles to move, if necessary, under the force of the expanding airbag. Hand sleeves may be provided to help maintain the pilot's hands on the grip handles during airbag expansion. The movable yoke and handle portions may be manually or automatically restored to normal operative positions after airbag deflation. The yoke may be formed so as to provide a U shaped section that accommodates a horizontal support or table for holding the airbag module, a map, or a like device. The U shaped yoke and table support members are structured such that the table remains horizontal during pivoting movement of the yoke to control aircraft roll, and during generally horizontal movement of the yoke to control aircraft pitch.

46 Claims, 7 Drawing Sheets

AIRCRAFT CONTROL YOKE

CROSS-REFERENCE TO RELATED APPLICATIONS

U.S. patent application Ser. No. 07/973,798, filed Nov. 9, 1992, and entitled "Aircraft Airbag Protection Apparatus and Method", incorporated herein by reference, now U.S. Pat. No. 5,301,902.

U.S. patent application Ser. No. 08/054,925, filed Apr. 28, 1993, and entitled "Adaptive Aircraft Airbag Protection Apparatus and Method", incorporated herein by reference, now U.S. Pat. No. 5,335,884.

BACKGROUND OF THE INVENTION

1. Field of the Invention

This invention relates to aircraft control yokes or shafts having a construction and arrangement to minimize interference between an expanding airbag and manually operable pilot control portions that are carried by the control yoke, wherein the construction and arrangement of the control yoke provides for restoration of the control yoke to its normal operative configuration in the event of inadvertent airbag inflation.

2. Description of the Related Art

The application of airbags as a safety feature to protect a vehicle occupant from injury has received considerable attention in the automobile industry. For example, U.S. Pat. No. 3,836,168 by Nonaka et al shows airbags which are functionally operable in conjunction with a shoulder harness.

The prior art has addressed specific applications of airbags to aircraft, such as in U.S. Pat. No. 3,218,103 by Boyce, U.S. Pat. No. 4,508,294 by Lorch, and U.S. Pat. No. 5,190,313 by Hickling. The Boyce patent teaches use of a relatively complete encapsulation of the occupant of a seat, although it is shown operational in conjunction with a shoulder harness. The Lorch patent includes a bidirectionally expanding set of airbags from a hoop around the waist of the aircraft occupant to encapsulate that occupant upon actuation. The Hickling patent describes the use of an airbag to prevent operator contact with the sighting tube of a combat helicopter.

The art teaches the use of vehicle steering means having adjustable portions therein. U.S. Defensive Publication T875,019 by C. J. Haddad et al describes a steering wheel having diametrically opposed sections that are radially extendable to thereby increase the effective diameter of the steering wheel. Manually-releasable locks hold these two section in place. An extendable handlebar-type steering device is also disclosed. U.S. Pat. No. 3,863,521 by S. L. Gatsos et al teaches a manually-adjustable bicycle handlebar.

The known prior art does not teach an aircraft yoke, control yoke post, or control yoke shaft that is constructed to extend, telescope, or move a limited distance toward the pilot as the airbag inflates, wherein the yoke carries telescoping, or movable handle portions, that allow left and/or right-hand pilot grip handles to extend, telescope, or move under the force of the expanding airbag, and wherein the movable yoke and handle portions are capable of manually or automatic restoration to normal operative positions after airbag deflation, nor does the prior art teach an aircraft control yoke or shaft that is formed to provide a U-shaped section that accommodates a horizontal support, or table for holding the airbag module, a map, or the like, the U-shaped yoke and table support members both being structured such that the support table remains horizontal during movement of the yoke to control aircraft roll and/or aircraft pitch.

SUMMARY OF THE INVENTION

This invention provides an aircraft control yoke or shaft that is constructed with extendable, or telescoping tubular elements, that allow both the control yoke and left and right hand pilot grip handles that are carried by the control yoke to move or extend during airbag inflation, this construction also providing a construction such that the control yoke may be subsequently manually, or automatically restored to a normal operative position after airbag deflation.

As a feature of the invention, the control yoke or shaft may be formed to provide a U-shaped section that accommodates a flat, horizontal support or table for holding an airbag module, a map, or the like. The U-shaped yoke post and table support members are structured such that the table remains essentially horizontal during pivoting movement of the yoke to control aircraft roll, and during generally horizontal movement of the yoke to control aircraft pitch.

In accordance with a feature of the invention, the control yoke, or control yoke post, may be constructed of telescoping or extendable elements. Upon airbag inflation, a force means is actuated, or enabled, that extends the control yoke a relatively short distance (for example, 3 to 6 inches) toward the pilot so as to position the pilot's handle grips clear of the inflated airbag. As a feature of the invention, padding may be provided on the control yoke to cushion impact of the control yoke with the pilot, should such an impact occur.

As a feature of the invention, the aircraft yoke carries manually-operable control portions, such as hand grips, that are force biased, as by the use of springs, to allow these control portions to move or pivot out of interference relationship with an expanding airbag, to thereby position these control portions for manual operation by the aircraft's pilot after complete expansion of the airbag has occurred.

In the event that airbag inflation was unintentional or accidental, such as for example by failure of the airbag module or failure of the airbag control means, the control yoke and/or handle portions of the invention can be manually or automatically restored to a normal operating condition so that the pilot may resume normal control of the aircraft.

As a feature of the invention, hand sleeves may be provided to help maintain the pilot's hands on the grip handles during an airbag inflation/deflation event.

As a further feature of the invention, the airbag is actuated by operation of a plurality of acceleration sensors, whose output signals are subject to a signal verification procedure, such as a majority voting procedure, before an airbag actuating signal becomes effective to actuate the airbag, and/or the yoke extension force means.

These and other objects, features and advantages of the invention will be apparent to those of ordinary skill in the art upon reference to the following detailed description, which description makes reference to the drawing.

DETAILED DESCRIPTION OF THE INVENTION

Figure 1:
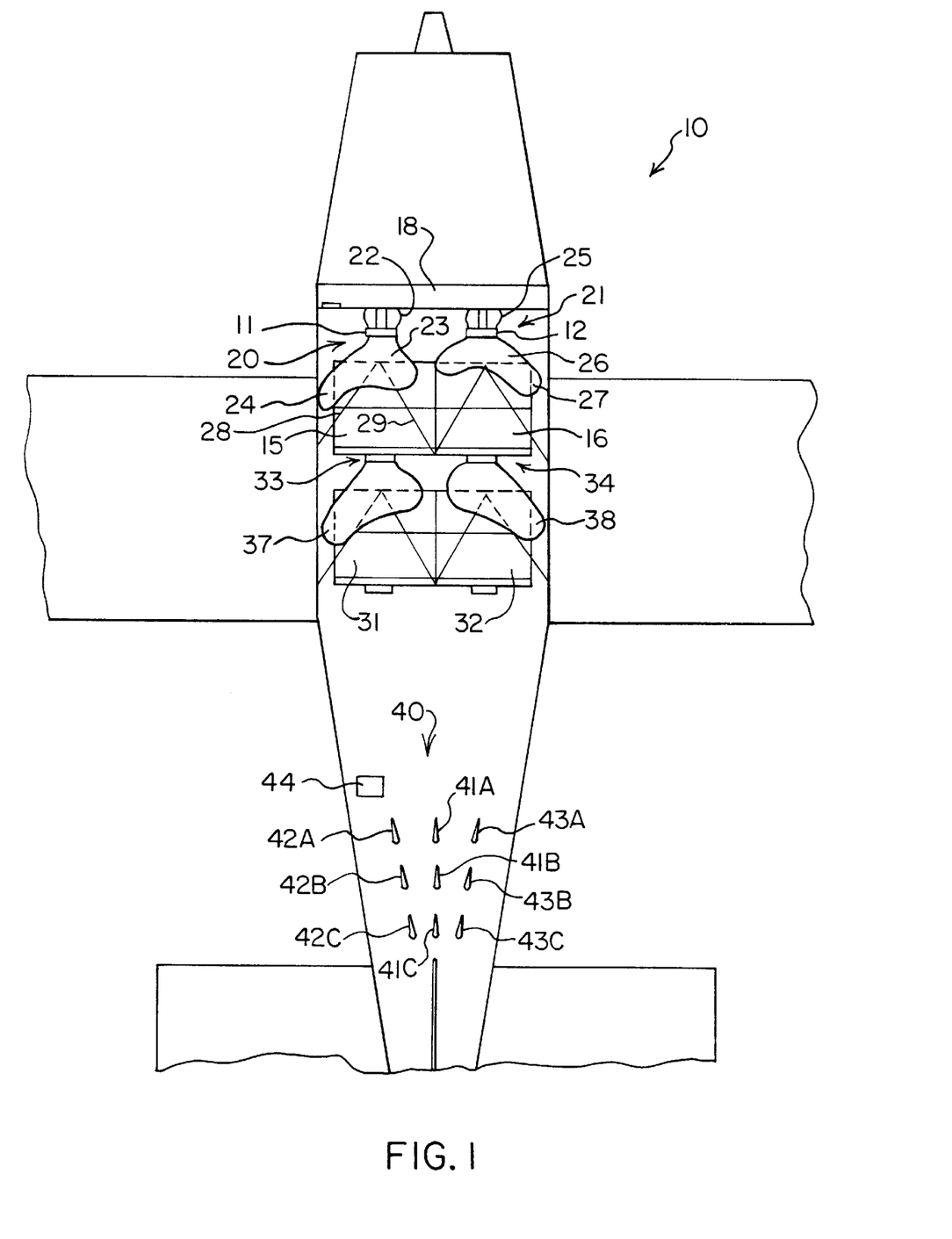
FIG. 1 is a top plan view of a four passenger aircraft that includes the present invention.

FIG. 1 is a top, somewhat schematic view of an exemplary four passenger aircraft 10 that includes the present invention. As is typical, aircraft 10 has two control columns, shafts, or yokes 11 and 12 extending generally horizontally toward seats 15 and 16 from the vertical instrument panel or front wall 18 as shown. Each of the yokes 11,12 includes a pilot-operable control portion, usually configured as an upward facing and generally U-shaped yoke handle 13,14. As is conventional, axial movement of yokes 11,12, toward and away from front wall 18, operates to control the aircraft's angle of attack, whereas rotation of a control yoke operates to control roll of the aircraft.

Airbag storage and actuating assemblies or modules 20 and 21 are, respectively, attached to (or constructed as an integral element of) each of the yokes 11 and 12, or are attached to front wall 18. Assemblies 20,21 are generally about 2×4×6 inches in size, and are connected to control circuitry via cable 19 of FIG. 2. Without limitation thereto, the airbags associated with assemblies 20,21 are each configured to produce dual lobes when actuated, such as lobes 22 and 23 for assembly 20, and lobes 25 and 26 for assembly 21. Lobes 22 and 25 extend toward the aircraft's vertical front wall 18, while lobes 23 and 26 extend toward the respective occupants of seats 15 and 16.

Figure 2:
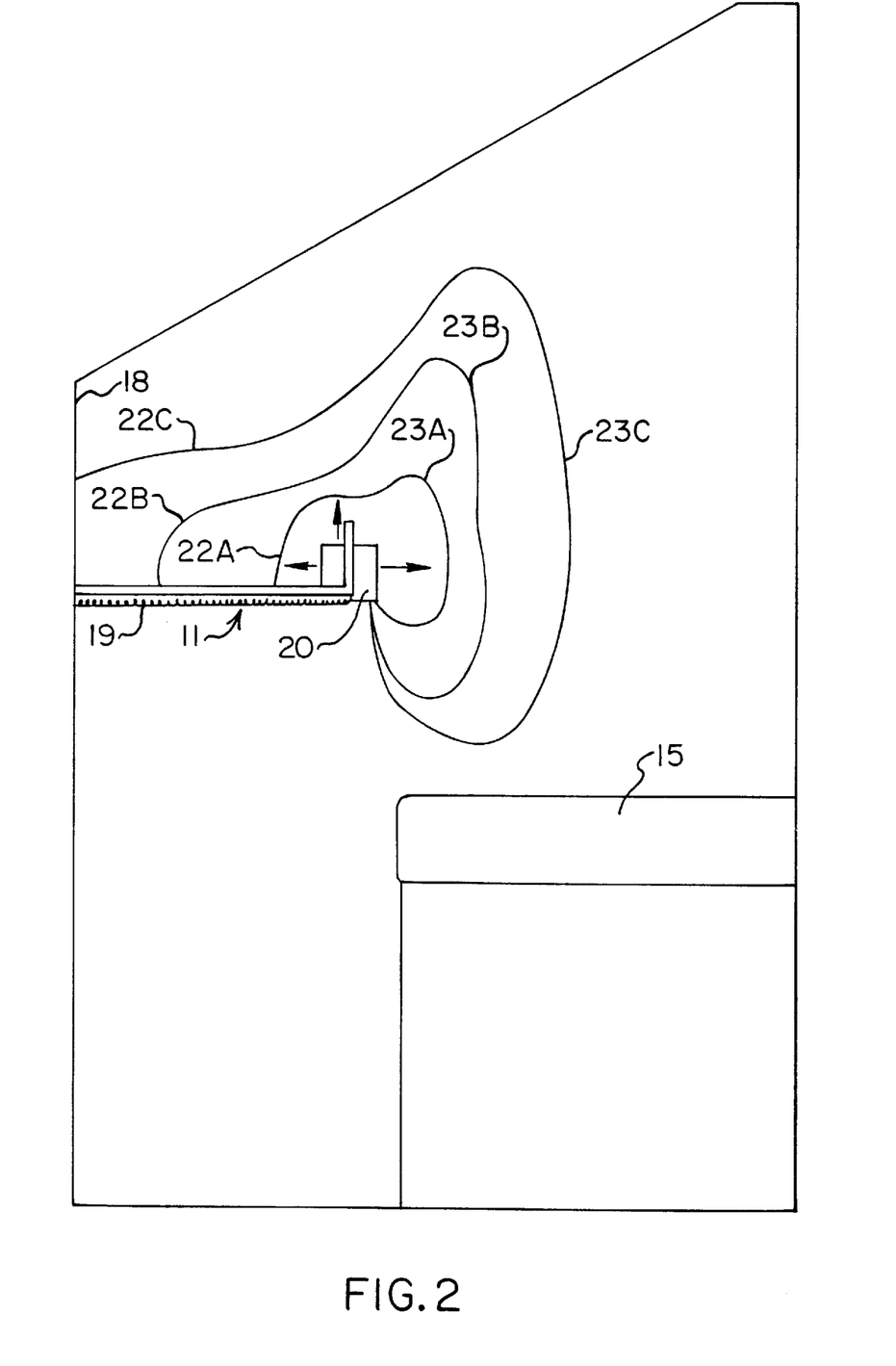
FIG. 2 is side view showing the sequential positioning of an airbag relative to the control yoke of the aircraft of FIG. 1, and showing in dotted line the extended position of the control yoke in accordance with the invention.

FIG. 2 presents a side view of yoke 11, and shows the airbag actuation sequence from airbag assembly 20. Discharge of expansion gas at assembly 20 causes the airbag to expand, as is generally illustrated by the three sequential airbag positions 22A/23A, 22B/23B and 22C/23C. The airbag is configured such that the forwardly-directed lobe 22 engages the aircraft's front wall 18 at approximately the same time that the full extension of rear-facing lobe 23 engages the front of the pilot, or occupant, in seat 15. As is well known, the two sequential events of airbag inflation and subsequent airbag deflation take place in about ⅒th of a second.

Rear seats 31 and 32 of aircraft 10, FIG. 1, likewise include airbag assemblies 33 and 34 which expand from the rear of seats 15 and 16 upon actuation thereof.

Other contemporary safety features can augment the protection of the occupants of aircraft 10. For example, a four-point safety harness (such as an arrangement employing harness straps 28 and 29 for seat 15 in FIG. 1) with a load limiter-type webbing can assist in increasing the ability to withstand a crash force. Also, seat cushions of a collapsible material that yields under high vertical loads can be used.

Mounted toward the tail of aircraft 10 are arrays 40 of acceleration-activated sensor strings 41, 42 and 43 of conventional and well-known construction. Sensor strings 41–43 are made up of multiple sensors to increase reliability. The central string, made up of sensors 41A, 41B and 41C, is essentially aligned with the central axis of aircraft 10, and therefore corresponds to the normal direction of travel of aircraft 10. The left string of sensors 42A–42C and right string of sensors 43A–43C are each offset in alignment from central string 41, such as by 30-degrees. This allows sensing of acceleration forces even when aircraft 10 is moving in a direction that is displaced from directly straight ahead, which frequently happens because of air currents, winds and the like. Of course, it is possible to include additional strings of sensors in a fan pattern in an even more offset relation to the central axis of aircraft 10.

A majority voting circuit, of well-known construction, for responding to the output signals produced by array 40 is mounted (for example, at 44). Circuitry 44 is coupled to receive the acceleration signals generated by array 40, when appropriate in accordance with majority voting techniques, to activate all of the above-mentioned aircraft airbag assemblies.

In normal operation, the sensors of array 40 are activated by an injury-threatening acceleration force that is located on the longitudinal aircraft axis, or is within a range of angular displacement from that axis, such as approximately 30-degrees on either side thereof. Single sensors or strings 41–43 are acceptable, but it is preferable to include two or more sensors in each full set of acceleration sensor strings for redundancy. If three sensors are used, as shown, and a majority output from at least two of the three sensors is needed to activate the airbag(s), the prospect of a false, inadvertent, or accidental activation of the airbag(s) becomes very remote.

It is to be understood that while the construction and arrangement of FIGS. 1 and 2 are in accordance with an embodiment of the invention, these structural details are not to be taken as a limitation on the spirit and scope of the invention.

In accordance with the invention, one or both of the yokes 11,12 is constructed and arranged to telescope, extend, or move away from instrument panel 18 in order to move portions of the yoke clear of the inflating airbag that is associated with the yoke; for example, see the extended dotted line position of yoke 11 in FIG. 2. This yoke extension function can be accomplished, for example, by the concurrent operation of a releasable coupling, or locking means, and a controllable force means that are timed to operate relative to the time of airbag inflation, or with movement of the airbag. An example of the utility of the invention is associated with an accidental, unintended, or malfunction inflation of the airbag. In the absence of a yoke constructed in accordance with this invention, an airbag inflation event, such as shown in FIG. 2, can force yoke 11 backwards (towards the pilot), thus undesirably forcing the aircraft into a nose-up attitude, and/or airbag inflation can bend yoke 11 downward. However, with yoke 11 constructed in accordance with the invention, airbag expansion is accompanied by the above-mentioned extension of yoke 11. In the event that the pilot desires to recover aircraft control after an airbag inflation/deflation event, yoke 11 of the invention is constructed to allow the pilot to reset yoke 11 to its normal operative and unextended condition.

Figure 3:
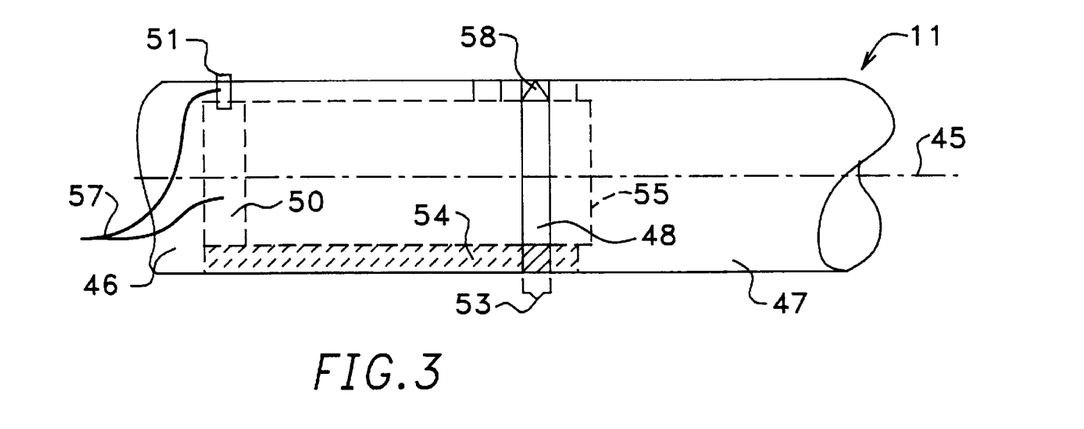
FIG. 3 shows the details of construction of the control yoke of FIGS. 1 and 2 that facilitate extension of the yoke in accordance with the invention.

FIG. 3 is a side view of a mid-portion of yoke 11 of the invention prior to airbag inflation; i.e, with yoke 11 is shown in the normal solid line operating condition of FIG. 2. As shown in FIG. 3, yoke 11 comprises a cylindrical forward tube 46 that extends from front panel 18, and a cylindrical rear tube 47 that extends toward the pilot. Tube 46 is hollow at the end that is adjacent to the pilot, so as to provide a closed cup-shaped cavity 49 therein, best seen in FIG. 4. An embodiment of the invention provides force means in the form of a gas-generating ignitable material, pellet, or capsule 50 that is contained within cavity 49; for example, material 50 may be of the well-known type that is used to inflate airbags.

Rear yoke tube 47 carries a smaller diameter cylindrical extension tube 48 that extends into cavity 49. Extension tube 48 is closed at its right hand end 55, and is of a diameter such that cavity 49 is generally closed by the presence of extension tube 48 therein. If desired, 0-rings (not shown) may be used in a known manner to ensure that a generally closed cavity 49 is formed.

Yoke portions 46 and 47 are keyed together, such as at 54, to allow axial movement of portion 47 to the right relative to portion 46, but at the same time, to provide for relative rotary movement between yoke portions 46 and 47. As an alternative, the function of key 54 can be accomplished by a yoke having portions 46,47 of generally square cross section.

Extension tube 48 is locked into the FIG. 3 position by the use of a breakaway, or electrically releasable locking means, such as pin 51. In the event that pin 51 is a solenoid or pin that is electrically releasable, a control conductor 52 can be provided to concurrently release pin 51 and fire-ignitable material 50; for example, by using the output of majority voting circuit 40, with or without, time delay. It is to be noted that in the normal operating condition of yoke 11, as shown in FIG. 3, a small axially-extending gap 53 exists between yoke portions 46 and 47, this position being maintained by operation of locking means 51.

Figure 4:
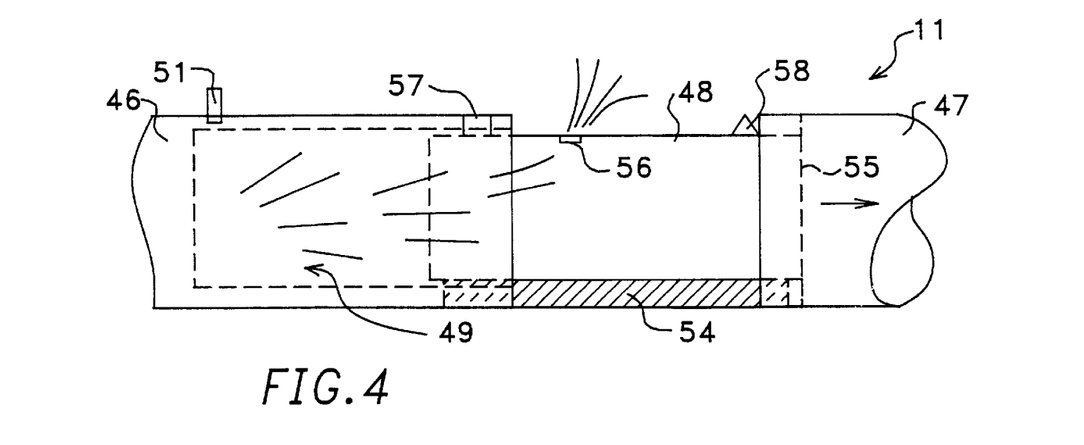
FIG. 4 shows the yoke of FIG. 3 in its extended position.

FIG. 4 shows yoke 11 of FIG. 3 in an extended position, as is caused, for example, by an airbag inflation event and by firing of capsule 50. In this extended position, the release of extension tube 48 by release means 51, and the gas pressure that is created by the concurrent firing of ignitable material 50, has caused yoke portion 47 to move to the right, toward the pilot, clear of airbag inflation. As shown in FIG. 4, extension tube 48 includes one or more gas pressure release means, in the form of a hole or port 56, that vents the high pressure gas within cavity 49 to atmosphere. Once gas pressure is vented, movement of extension tube 48 ceases. As is well known, a means (not shown) is preferably provided to mechanically limit this movement of extension tube 48 so that it does not uncouple from tube 46. In the FIG. 4 position of control yoke 11, the pilot no longer has control of the aircraft's angle of attack, but key 54 provides that the pilot may still control the roll attitude of the aircraft.

Figure 5:
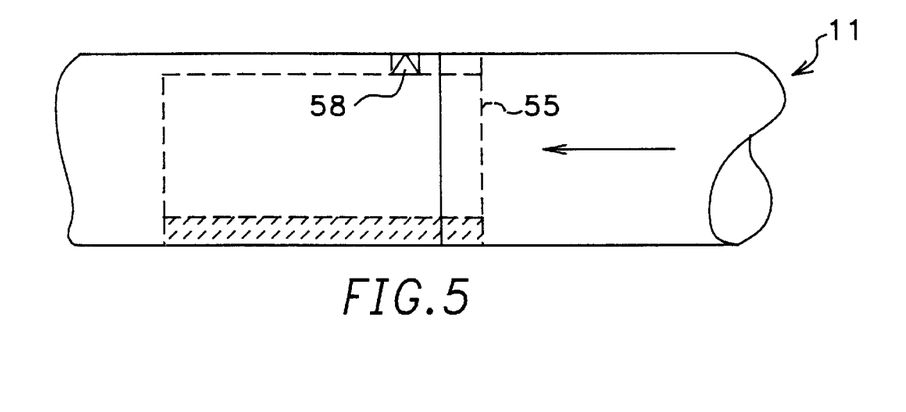
FIG. 5 shows the yoke of FIG. 4 after it has been manually reset from its extended position to its normal operating condition.

It should be noted that the inflation of the airbag associated with yoke 11, and its subsequent deflation, takes place in a very short time interval, usually about 1/10th second. Thus, after this short time interval, the pilot may restore yoke 11 to its normal operative position, as shown in FIG. 5. In this figure, the pilot has pushed yoke portion 47 to the left toward front wall 18, and this movement is guided by key 54. Yoke portion 47 carries a reattach means 58, which may be a spring-loaded pin 58 that engages a notch, or opening, 61 that is formed in yoke portion 46. Now that yoke 11 has been restored to its operative condition, the pilot may again control the aircraft's angle of attack attitude.

As is apparent from the above description, the invention can be characterized as an elongated aircraft control yoke 11 comprising a two-piece tubular member 46,47 having a central axis 45, the control yoke having a first piece 46 extending from control panel 18, and having a second piece 47 extending from the first piece and terminating at a T-shaped portion 59 that includes a left hand grip 60 and a right hand grip 61, the first piece of the control yoke being rotatable about axis 45 to control aircraft roll, and the first piece of the control yoke being movable along axis 45 to control aircraft angle of attack. The two pieces of control yoke 11 have a normal relative position shown in FIG. 3 whereby hand grips 60 and 61 are operable to effect control of both aircraft roll and aircraft angle of attack. An airbag is associated with control yoke 11, the airbag being subject to inflation as a function of an aircraft force. A force means 50 is operable as a function of airbag inflation to effect relative movement of the two pieces 46 and 47 of control yoke 11 to an extended length relative position as shown in FIG. 4. Control yoke 11 is constructed, as by the use of key 54, to accommodate only rotation of the control yoke when the control yoke is in the extended length relative position, whereby hand grips 60 and 61 are operable to effect control of only aircraft roll.

A manual reset means 57,59 is operable to accommodate resetting of control yoke 11 from its extended length relative position to a reset normal relative position, as shown in FIG. 5.

A means 62 is associated with T-shaped portion 59, and operates to effect pivoting of at least one of hand grips 60 and 61 toward axis 45 and toward control panel 18, as a function of airbag inflation, and pivot 62 is operable to accommodate resetting of the hand grip.

In the normal mode of controlling aircraft 10, the pilot who is sitting, for example, in left-hand seat 15 of FIG. 1, will have his left hand on the yoke's left control handle, as his right hand tends to other matters, such as the radio and the instruments of the aircraft. Thus, the firing of FIG. 3's ignitable material 50 will tend to jar the pilot's left hand as yoke 11 expands to its FIG. 4 position. A normal reaction of the pilot is to resist this movement of yoke 11 to the FIG. 4 position.

Figure 6:
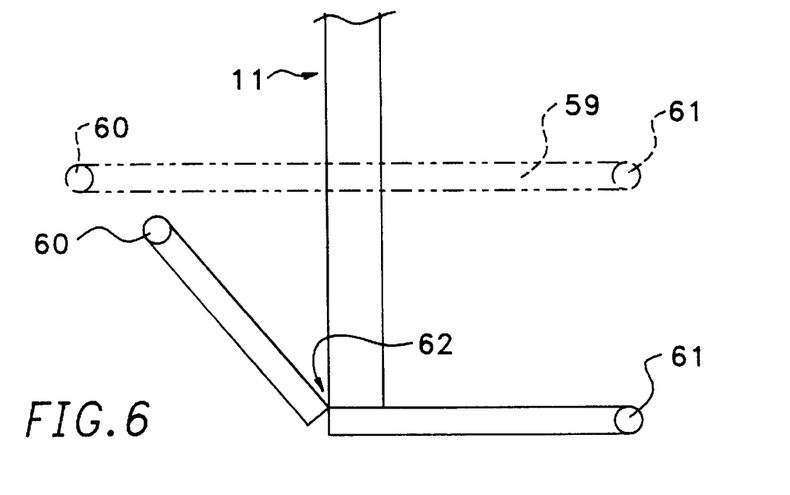
FIG. 6 shows a feature of the invention whereby the handle portion of the yoke of FIGS. 3–5 is constructed to pivot upon extension of the yoke as shown in FIG. 4.

FIG. 6 shows a feature of the invention whereby the yoke's left control handle 60 is constructed to accommodate this tendency of the pilot to resist yoke expansion. In this arrangement of the invention, left control handle 60 is mounted on yoke 11 by way of a breakaway pivot 62. Again, pivot 62 is resettable by the pilot to the normal position, shown dotted in FIG. 6, so that the pilot may restore yoke 11 and handle 60 to the normal operating position; for example, in the event of an accidental airbag inflation/deflation event.

The details of construction of breakaway pivot or hinge 62 are not critical to the invention. As is well known, many hinge constructions provide that the hinging action will occur only after a certain force has been applied to the hinge. Thus, in normal flight control, such as a change in the aircraft's angle of attack, hinge 62 will not break away. As an alternative, hinge 62 could be constructed to be electrically actuated concurrently with inflation of the airbag, and/or concurrently with firing of ignitable material 50, and/or concurrently with electrical actuation of locking pin 51.

In accordance with the spirit and scope of the invention, the yoke's right control handle 61 may also be constructed as shown in FIG. 6, and yoke 12 of FIG. 1 may also contain breakaway control handles as above described.

A feature of the present invention provides that aircraft control yokes 11,12 have a construction and arrangement to minimize interference between an expanding airbag 20,21 and pilot operable manual control handles 13,14 that are carried by control yokes 11,12.

Figure 7:
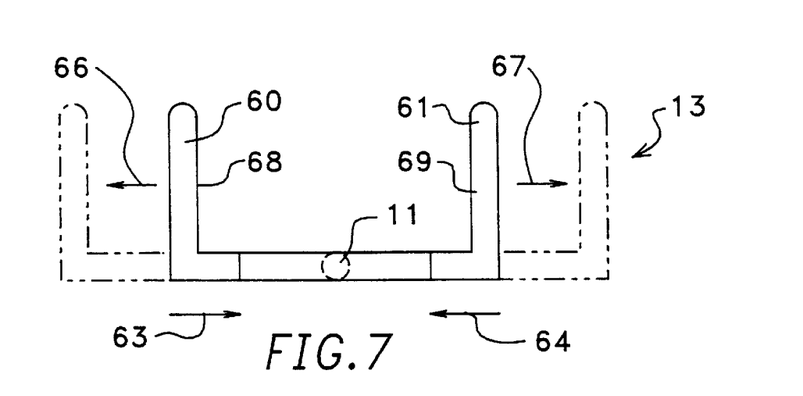
FIG. 7 is a vertical plan view of a yoke handle of FIGS. 1 and 2 in accordance with a feature of the invention.
Figures 9, 10:
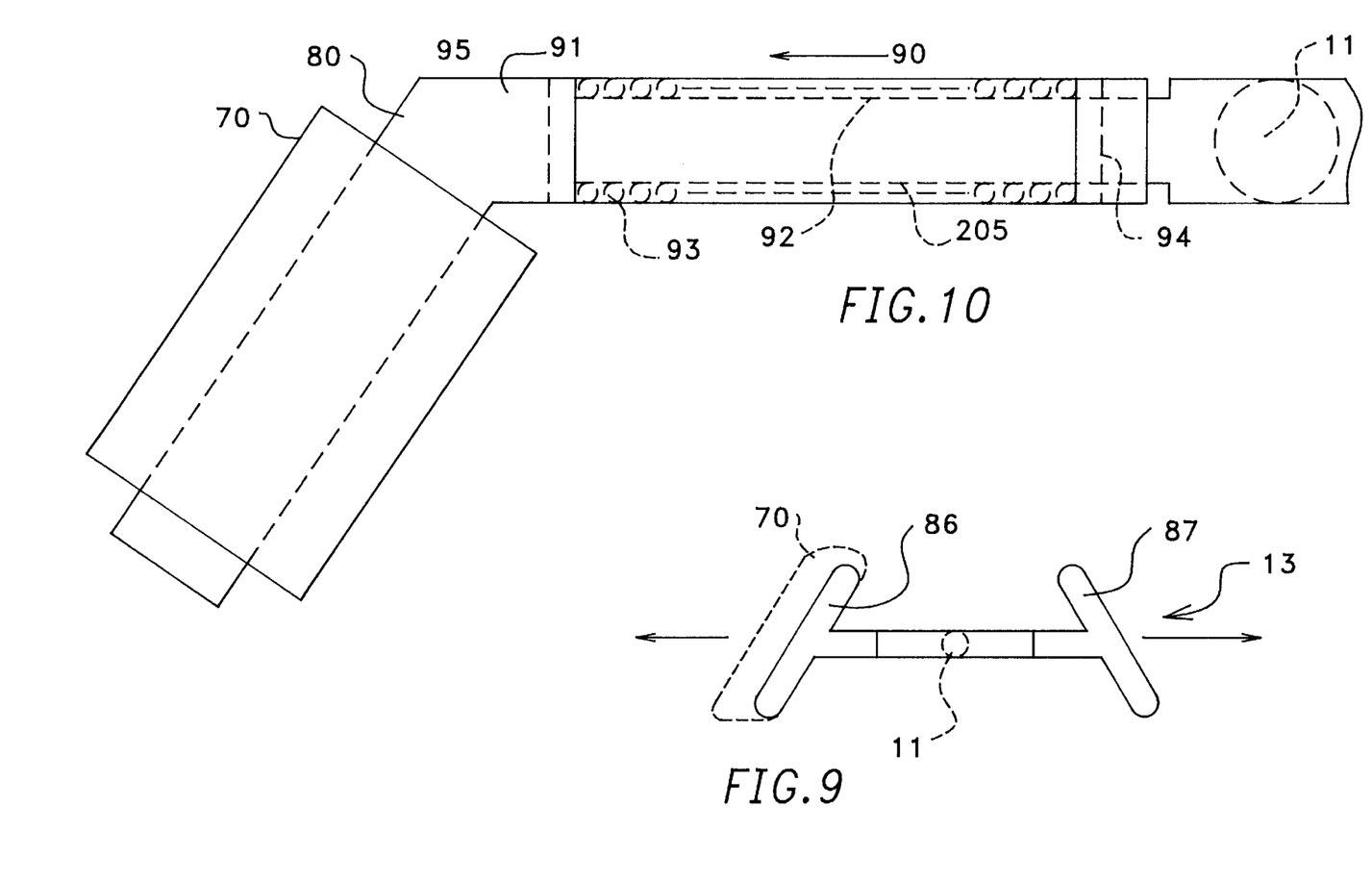
FIG. 9 is a vertical plan view of a third yoke handle in accordance with a feature of the invention.
FIG. 10 is a detailed view of the force biasing spring arrangement that is used in FIGS. 7–9.

FIG. 7 is a vertical plan view of control yoke 13 in accordance with this feature of the invention. As can be seen, yoke 13 includes two spaced, generally parallel, and vertically-extending handles 60 and 61 that are adapted to be grasped by the left and right hands, respectively, of the pilot who is sitting on seat 15. In the normal operable position (i.e., without airbag 20 actuated), handles 60,61 are spaced about 10-inches apart, and extend about 4-inches in the vertical direction, or perhaps are tilted down, as shown in FIG. 9.

In accordance with the invention, handles 60,61 are spring biased inwardly toward yoke 11 by operation of internal springs that are represented by force arrows 63,64. When airbag 20 is actuated, as above described, the airbag expands in a well-known manner. The desired effect of airbag 20 is to shield the pilot, or occupant, in seat 15 from injury, or at least to minimize injury. Unlike an automobile situation, in many cases, the pilot may be able to control, or somewhat control, aircraft 10 after an event which causes airbag 20 to be actuated.

In accordance with this feature of the invention, expanding airbag 20 engages the inside surfaces 68 and 69 of handle portions 60,61. Airbag 20 thus operates to cause handle portions 60,61 to move outward, as is represented by arrows 66 and 67, thereby overcoming the bias force 63,64 of the internal springs. As a result, handle portions 60,61 assume the dotted-line positions shown in FIG. 7. In this position of handle portions 60,61, the pilot is able to assume a degree of control of the aircraft after airbag 20 has fully expanded.

Figure 8:
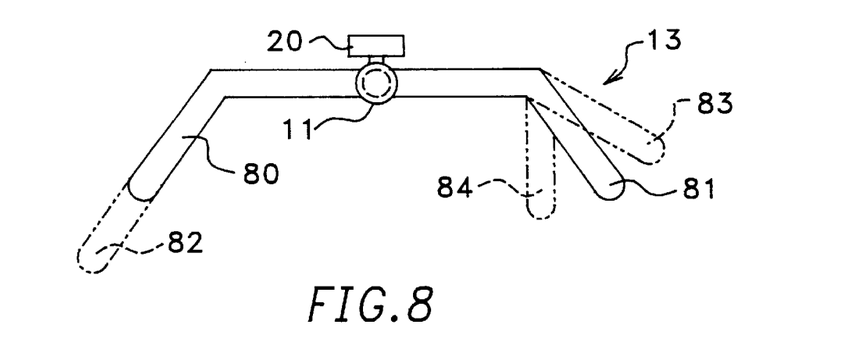
FIG. 8 is a vertical plan view of a second yoke handle in accordance with a feature of the invention.

FIG. 8 shows an embodiment of the invention wherein handle portions 80 and 81 extend downward. As shown by dotted lines 82, handle portions 80,81 are constructed so as to allow the pilot to lengthen these handle portions for comfort, if desired. In addition, as shown by dotted lines 83 and 84, handle portions 80,81 are constructed to pivot so as to allow the pilot to position handle portions 80,81 to maximize comfort.

FIG. 9 shows an embodiment of the invention wherein handle portions 86 and 87, corresponding to handle portions 60 and 61 of FIG. 7, are tilted somewhat from the vertical, and include a hand pocket 70 on one, or both, of the handle portions 86,87. Hand pocket 70 may comprise a cloth-like sleeve in which the pilot's hands are releasably encapsulated. While this construction and arrangement is not critical to embodiments of the invention, this construction has utility in that it ensures that the pilot's hands will not be forced from handle portions 86,87 by expansion of airbag 20.

In both FIG. 7 and FIG. 8, expansion of airbag 20 operates to horizontally separate handle portions 80,81 and 60,61 as above described relative to FIG. 7.

In the embodiments of FIGS. 7–9 the placement of airbag 20 is not critical to the invention. As those skilled in the art will appreciate, in order for airbag 20 to perform its intended function, the expansion of airbag 20 may interfere with subsequent pilot access to handle portions 60,61, 80,81 and 86,87. The unique construction and arrangement of the invention provides movement of these handle portions, under the force exerted by airbag 20, so as to position these handle portions for continued access by the hands of the pilot.

FIG. 10 provides a view of the above-mentioned spring construction and arrangement. For illustration only, and without limitation thereto, the handle configuration of FIG. 8 is shown in FIG. 10, wherein hand pocket 70 is attached to handle portion 80 for the utility above described. In order to facilitate movement 90 of handle portion 80 under the force of an expanding airbag, handle portion 80 is formed as an extension of a hollow tubular section 91. Section 91 is mounted on a tubular member 92 having a smaller outer diameter than the inner diameter of section 91. An extension spring 93 is loosely contained between the inner wall of section 91 and the outer wall of member 92. The right hand end of spring 93 is attached to member 92 (for example, by a clamping ring 94), and the left hand end of spring 93 is attached to section 91 (for example, by a clamping ring 95). Thus, in the absence of the force exerted by an expanding airbag, section 91 and member 92 remain in the position shown in FIG. 10. However, when handle portions 80,81 are engaged by an expanding airbag, spring 93 extends, allowing handle portions 80,81 to assume the extended position.

The force provided by spring 93 reliably maintains parts 91,92 in the position shown in FIG. 10 during all pilot control movements associated with flying aircraft 10. However, upon actuation of airbag 20, parts 91,92 move relative to one another to thereby provide the utility above described.

From the above description, it can be seen that this feature of the invention provides two manually-operable control handles, shown as 60,61 in FIG. 7, that are arranged in a first, spaced-apart position, whereat the control handles may be gripped by the two hands of an aircraft pilot during flight of aircraft 10. A control yoke 11 is arranged generally in the center of spaced control handles 60,61. Two telescoping tubular member pairs 91,92, shown in FIG. 10, connect control yoke 11 to each of the two control handles 60,61. Two force-bias springs 93 are provided, one spring 93 being associated with each of the two telescoping member pairs 91,92. Springs 93 are arranged to normally maintain control handles 60,61 in the first spaced-apart position relative to control yoke 11, as is shown in solid lines in FIG. 7. A protective airbag means 20 is arranged, generally centrally relative to control yoke 11, the aircraft pilot on seat 15, and the two spaced control handles 60,61. Airbag means 20 is subject to inflation as a function of acceleration sensing means 40 shown in FIG. 1. The force-bias springs 93 operate to allow control handles 60,61 to move apart to a second spaced-apart position, as shown in dotted lines in FIG. 7. This second position provides access to control handles 60,61 by the hands of the aircraft pilot for continued control of aircraft 10 after inflation of airbag means 20.

As a feature of the invention, airbag means 20 is subject to inflation as a function of G force, or acceleration sensors 40, and a hand sleeve 70, shown in FIG. 9, is associated with each of the control handles 60,61. Hand sleeves 70 operate to releasably hold the hands of the aircraft pilot on control handles 60,61 during inflation of airbag means 20.

Figure 11:
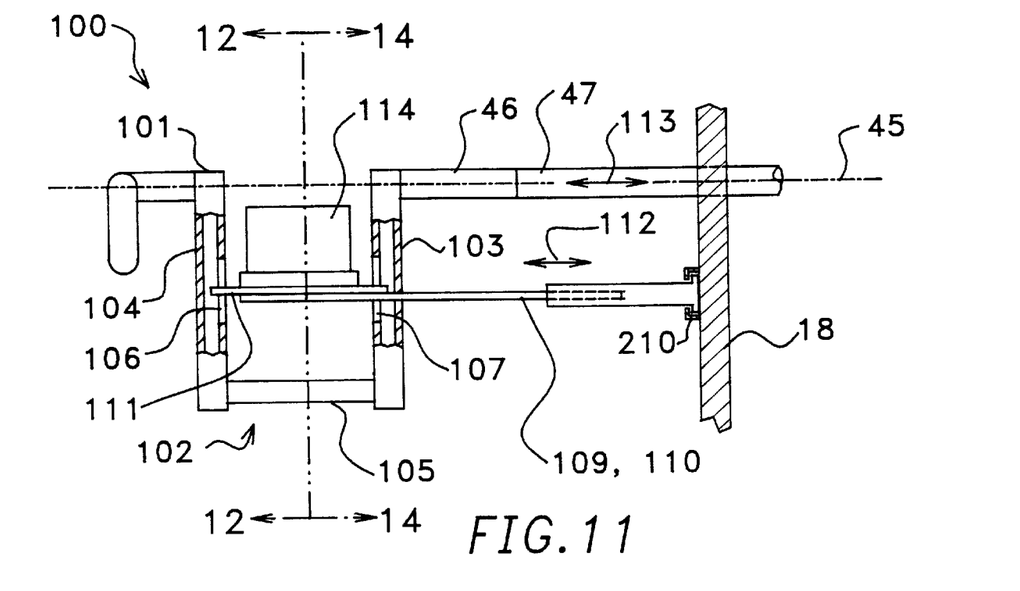
FIG. 11 is a side view of a U-shaped aircraft control yoke in accordance with the invention, the control yoke of FIG. 11 also including a yoke extension feature in accordance with the invention.

FIG. 11 is a side view of a U-shaped aircraft control yoke or yoke post 100 in accordance with the invention. While control yoke 100 includes the above-described yoke extension feature, as is shown by numerals 46 and 47 in FIG. 11, this aspect of the invention is not to be limited to the use of this yoke extension feature. In addition, when the yoke extension feature is included, it is within the spirit and scope of the invention to provide the yoke extension feature in the horizontal tubular portion 101 of control yoke 100.

In accordance with this feature of the invention, control yoke 100 includes an upward-facing U-shaped control post portion 102 having spaced, and generally vertically parallel tubular legs 103 and 104, that are joined together by a generally horizontal tubular bottom leg 105. Legs 103,104 are, respectively, provided with an elongated guide slot 106,107 on the inner facing surfaces of legs 103,104.

A flat, and generally horizontal table 108, is horizontally movably mounted to the aircraft's instrument panel 18 by way of a pair of spaced, horizontally extending, and parallel telescoping or extendable rods 109,110 of conventional construction. Rods 109,110 are freely movable in a generally horizontal direction, as is indicated by arrow 112, as control yoke 100 moves, as is indicated by arrow 113, to control the aircraft's pitch attitude. Rods 109,110 are also freely movable in a horizontal direction that is perpendicular to direction 112, as is indicated by arrow 202 in FIG. 12. As shown in FIGS. 11, 12, 13 and 14, the end of rods 109,110, adjacent to instrument panel 18, are slidably carried by guides 211,210, respectively.

While preferred embodiments of the invention described herein utilize telescoping rods, such as 109,110, it is to be understood that the spirit and scope of the invention applies equally well to a control yoke, control shaft, or control column of any contruction that is made to be movable or extendable. Thus, the detailed showing of rods 109,110 is not to be taken as a limitation on the spirit and scope of the invention.

Table 108 is supported within the yoke's U-shaped post portion 102 by rods 109,110 that extend parallel to the yoke's rotational axis 45. The bottom surface, or perhaps the top surface, of table 108 carries a centrally-located guide rod 111 that also extends parallel to rotational axis 45. Guide rod 111 freely slides in guide slots 106,107 that are carried by the inner facing surfaces of legs 104,103, respectively.

Table 108 functions to support an aircraft accessory, such as airbag module 114, or perhaps a map support device. The construction and arrangement of control yoke 100, table 108 table support rods 109,110, table guide rod 11, and yoke guide slots 106,107 is to allow free rotation of control yoke 100 about its axis 45 during control of the aircraft's roll attitude, and yet maintain table 108 generally horizontal independent of this rotation of yoke 100.

While the manner in which an airbag module is supported is not a limitation on the utility of this invention's extendable or telescoping yoke feature, the combination of this extending or telescoping yoke feature and the feature of mounting airbag module 114 on table 108, as above described, provides a new and unusual combination of elements having great utility relative to the use of airbags in aircraft.

Figure 12:
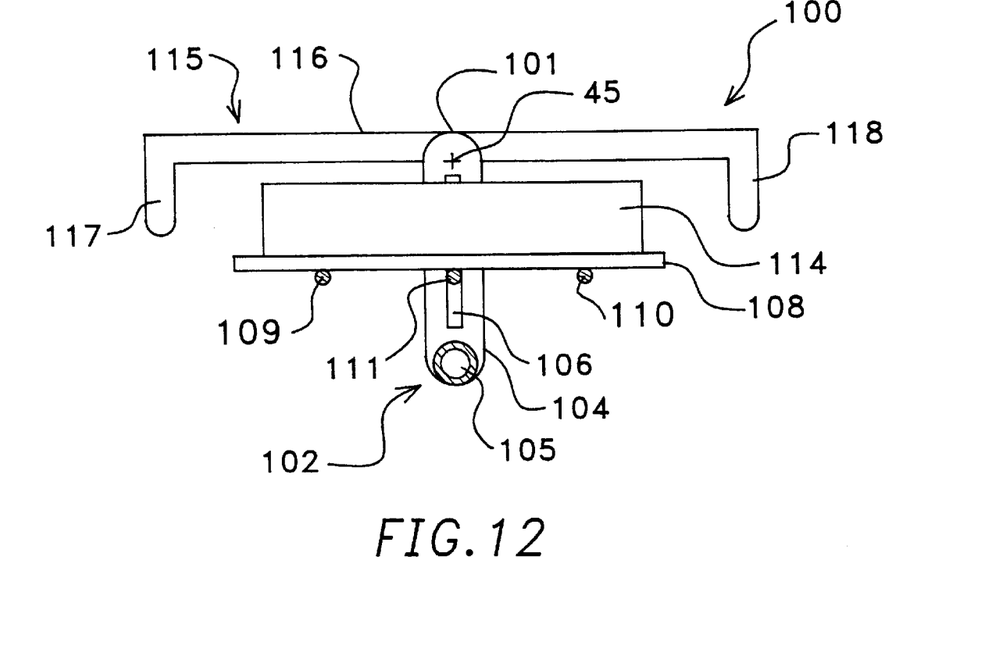
FIG. 12 is a section view of the control yoke of FIG. 11 taken on the lines 12—12 of FIG. 11.

FIG. 12 is a section view of control yoke 100 taken on the lines 12—12 of FIG. 11. This view clearly shows the relationship of the table's guide rod 111, and the guide slot 106 that is formed on the inner surface of yoke leg 104. The guide slot 107 in yoke leg 103 cooperates with guide rod 111 in an identical manner.

Figure 13:
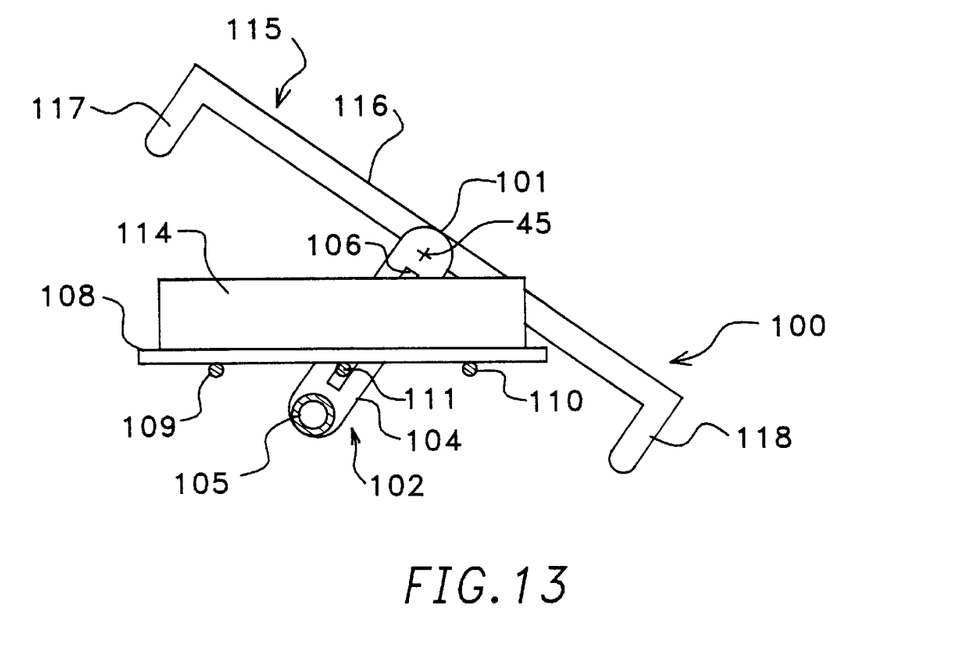
FIG. 13 is a view similar to FIG. 12, but showing the manner in which the table of FIGS. 11 and 12 remains generally horizontal during rotation of the control yoke to control aircraft roll.
Figure 14:
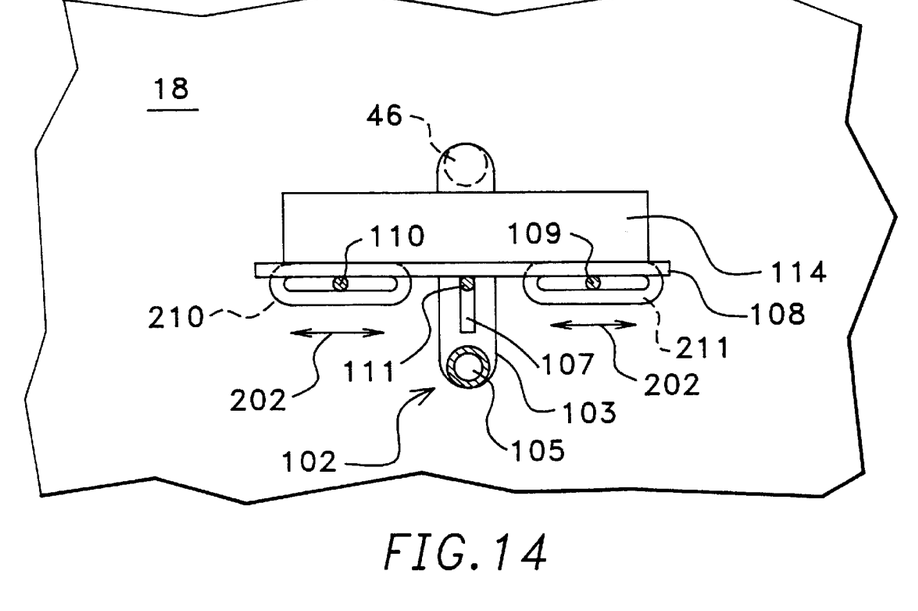
FIG. 14 is a section view of the control yoke of FIG. 11 taken on the lines 14—14 of FIG. 11.

FIG. 13 is a view similar to FIG. 12, but shows the manner in which table 108 remains generally horizontal during rotation of control yoke 100 about axis 45 to control aircraft roll. In the position of control yoke 100, shown in FIG. 13, guide rod 111 has been freely guided to the bottom portion of guide slot 107 in leg 104. Guide rod 111 has likewise moved to the bottom portion of guide slot 107 in leg 103. In addition, rods 109,110 have moved to the right in guides 211,210, respectively.

FIGS. 12 and 13 show another feature of the invention, whereby control yoke 100 terminates at a pilot handle portion 115 of unique construction. Handle portion 115 includes a T leg 116 that extends generally parallel to instrument panel 18 and perpendicular to axis 45, and also extends an equal distance on each side of axis 45; for example, about 6-inches on each side of axis 45. The two opposite ends of T leg 116 respectively terminate in a downward-extending right-hand grip 117, and a downward-extending left-hand grip 118.

While the invention has been described while making reference to preferred embodiments thereof, it is recognized that those skilled in the art will, upon learning of the invention, readily visualize yet other embodiments that are within the spirit and scope of the invention. Thus, it is not intended that the above detailed description be taken as a limitation on the invention.

What is claimed is:

1. In an aircraft having a control yoke and having an airbag associated therewith, said airbag being subject to inflation as a function of forces exerted upon the aircraft, the improvement comprising;
    said control yoke having first and second portions that are movable from a normal position to an extended position, to thereby form a control yoke of extended length, and
    force means operable as a function of airbag inflation to effect movement of said control yoke to said extended position.

2. The improvement of claim 1 including;
    reset means operable to accommodate resetting of said control yoke from said extended position to said normal position.

3. The improvement of claim 1 wherein said airbag is subjected to an inflation/deflation sequence of short time duration, wherein said force means is controlled as a function of said airbag inflation/deflation sequence, and including reset means operable to accommodate resetting of said control yoke from said extended position to said normal position subsequent to said airbag inflation/deflation event.

4. In combination;
    a two-piece elongated aircraft control yoke, said two pieces of said control yoke having a normal relative position whereby said control yoke is operable to effect two modes of aircraft control,
    an airbag associated with said control yoke, said airbag being subject to inflation as a function of an aircraft force, and
    force means operable as a function of airbag inflation to effect movement of said two pieces of said control yoke to an extended length relative position, whereat said control yoke is operable to effect only one of said two modes of aircraft control.

5. The combination of claim 4 including;
    manual reset means operable to accommodate resetting of said control yoke from said extended length relative position to said normal relative position.

6. The combination of claim 4 wherein said airbag is subjected to an inflation/deflation sequence of short time duration, wherein said force means is controlled as a function of said airbag inflation/deflation sequence, and including manual reset means operable to accommodate resetting of said control yoke from said extended length relative position to said normal position subsequent to said airbag inflation/deflation event.

7. In combination;
an elongated aircraft control yoke comprising a two-piece tubular member having a central axis, said control yoke having a first piece extending from a control panel, and a second piece extending from said first piece and terminating at a T-shaped portion that includes a left-hand grip and a right-hand grip, said first piece of said control yoke being rotatable about said axis to control aircraft roll, and said first piece of said control yoke being movable along said axis to control aircraft angle of attack,
said two pieces of said control yoke having a normal relative position, whereby said hand grips are operable to effect control of both aircraft roll and aircraft angle of attack,
an airbag associated with said control yoke, said airbag being subject to inflation as a function of an aircraft force,
force means operable as a function of airbag inflation to effect relative movement of said two pieces of said control yoke to an extended length relative position, and
said control yoke being constructed to accommodate only rotation of said control yoke when in said extended length relative position, whereby said hand grips are operable to effect control of only aircraft roll.

8. The combination of claim 7 including;
reset means operable to accommodate resetting of said control yoke from said extended length relative position to said normal relative position.

9. The combination of claim 7 wherein said airbag is subjected to an inflation/deflation sequence of short time duration, wherein said force means is controlled as a function of said airbag inflation/deflation sequence, and including manual reset means operable to accommodate resetting of said control yoke from said extended length relative position to said normal position subsequent to said airbag inflation/deflation event.

10. The combination of claim 7 including means associated with said T-shaped portion and operated to effect pivoting of at least one of said hand grips toward said axis and toward said control panel as a function of airbag inflation.

11. The combination of claim 10 including;
reset means operable to accommodate resetting of said control yoke and resetting of said at least one hand grip.

12. The combination of claim 10 wherein said airbag is subjected to an inflation/deflation sequence of short time duration, wherein said force means is controlled as a function of said airbag inflation/deflation sequence, and including manual reset means operable to accommodate resetting of said control yoke and resetting of said at least one hand grip subsequent to said airbag inflation/deflation event.

13. The combination of claim 7 wherein said force means comprises an ignitable source of gas that is operable to generate gas pressure that is operable to effect relative movement of said two pieces of said control yoke to said extended length relative position, and including means for venting said gas pressure when said extended length relative position is achieved.

14. The combination of claim 13 including first locking means for locking said first and second pieces of said control yoke in said normal position, and means for releasing said locking means and igniting said source of gas.

15. The combination of claim 14 including manual reset means operable to accommodate resetting of said control yoke from said extended length relative position to a reset normal relative position, and second locking means for locking said first and second yoke pieces in said reset normal position.

16. The combination of claim 7 including first locking means for locking said first and second pieces of said control yoke in said normal position, and means for concurrently releasing said locking means and operating said force means.

17. The combination of claim 16 including manual reset means operable to accommodate resetting of said control yoke from said extended length relative position to a reset normal relative position, and second locking means for locking said first and second yoke pieces in said reset normal position.

18. The combination of claim 10 wherein said two hand grips are arranged in a first spaced position whereat said hand grips may be gripped by the hands of an aircraft pilot during flight, force bias means associated with said hand grips and operable to maintain said hand grips in said first position, said airbag when inflated operating to physically engage said hand grips and to move said hand grips to a second spaced position providing access of said control handles for continued control of said aircraft.

19. The combination of claim 18 including a hand sleeve associated with at least on of said hand grips, said hand sleeve being operable to releasably hold the pilot's hands on said one hand grip during inflation of said airbag.

20. An aircraft control yoke extending outward from a generally vertical aircraft instrument panel, comprising;
a first rigid, elongated, and generally horizontal yoke member rotatable about a generally horizontal axis to control aircraft roll and movable toward and away from said instrument panel to control aircraft pitch, said first horizontal yoke member having a first end extending toward said instrument panel and having a second end,
a rigid, upward facing, U-shaped yoke post member having two horizontally spaced and vertically extending side legs whose bottom ends are joined together by a bottom leg, a top end of a first of said side legs being connected to said second end of said first horizontal yoke member,
first and a second elongated guide slots formed in said side legs so as to place said guide slots in parallel facing relation to each other,
a generally horizontal support member located within said U-shaped yoke post portion,
a rigid, elongated, guide rod carried by said support member, said guide rod having opposite ends thereof freely slidable in said first and second guide slots, and
extendable support means mounting said support member to be supported by said instrument panel.

21. The control yoke of claim 20 including pilot control handle means connected to a top end of a second of said side legs.

22. The control yoke of claim 21 wherein said handle means comprises;
a second rigid, elongated, and generally horizontal yoke member rotatable about said generally horizontal axis and having a first end connected to said top end of said second side leg, a rigid, elongated, T member connected to a second end of said second horizontal yoke member, said T member extending generally perpendicular to said axis, said T member having first and second ends located generally equal distances on opposites side of said axis, and first and second hand grips extending from said first and second ends respectively of said T member.

23. The control yoke of claim 20 wherein said extendable support means comprises;

a first and a second elongated, generally horizontal, generally parallel, and freely extendable support rods having first and second ends, said first ends of said support rods being mounted to said instrument panel, and said second ends of said support rods being mounted to said support member generally equidistant on opposites sides of said guide rod, said support rods extending generally parallel to said axis and to said guide rod.

24. The control yoke of claim 23 including pilot control handle means connected to a top end of a second of said side legs.

25. The control yoke of claim 24 wherein said handle means comprises;

a second rigid, elongated, and generally horizontal yoke member rotatable about said generally horizontal axis, and having a first end connected to said top end of said second side leg, a rigid, elongated, T member connected to a second end of said second horizontal yoke member, said T member extending generally perpendicular to said axis, said T member having first and second ends located generally equal distances on opposites side of said axis, and first and second hand grips extending generally downward from said first and second ends respectively of said T member.

26. An aircraft control yoke extending outward from a generally vertical aircraft instrument panel, comprising;

a first rigid, elongated, and generally horizontal yoke member rotatable about a generally horizontal axis to control aircraft roll and movable toward and away from said instrument panel to control aircraft pitch, said first horizontal yoke member having a first end extending toward said instrument panel and having a second end, a rigid, upward facing, U-shaped yoke member having two horizontally spaced and vertically extending side legs, whose bottom ends are joined together by a bottom leg, a top end of a first of said side legs being connected to said second end of said first horizontal yoke member, first and a second elongated guide slots formed in said side legs so as to place said guide slots in parallel facing relation to each other, a generally horizontal support member located within said U-shaped yoke portion, said support member having an upper surface, a rigid, elongated, guide rod carried by said support member, said guide rod having opposite ends thereof freely slidable in said first and second guide slots, extendable support means mounting said support member to be supported by said instrument panel, an airbag mounted on said upper surface of said support member, said airbag being subject to inflation as a function of forces exerted upon the aircraft, said first yoke member having first and second portions that are movable from a normal position to an extended position, to thereby form a control yoke of extended length, and force means operable as a function of airbag inflation to effect movement of said control yoke to said extended position.

27. The control yoke of claim 26 including;

reset means operable to accommodate resetting of said control yoke from said extended position to said normal position.

28. The control yoke of claim 26 wherein said airbag is subjected to an inflation/deflation sequence of short time duration, wherein said force means is controlled as a function of said airbag inflation/deflation sequence, and including reset means operable to accommodate resetting of said control yoke from said extended position to said normal position subsequent to said airbag inflation/deflation event.

29. The control yoke of claim 28 including pilot control handle means connected to a top end of a second of said side legs.

30. The control yoke of claim 29 wherein said handle means comprises;

a second rigid, elongated, and generally horizontal yoke member rotatable about said generally horizontal axis, and having a first end connected to said top end of said second side leg, a rigid, elongated, T member connected to a second end of said second horizontal yoke member, said T member extending generally perpendicular to said axis, said T member having first and second ends located generally equal distances on opposites side of said axis, and first and second hand grips extending from said first and second ends respectively of said T member.

31. The control yoke of claim 26 wherein said extendable support means comprises;

a first and a second elongated, generally horizontal, generally parallel, and freely extendable support rods having first and second ends, said first ends of said support rods being mounted to said instrument panel, and said second ends of said support rods being mounted to said support member generally equidistant on opposites sides of said guide rod, said support rods extending generally parallel to said axis and to said guide rod.

32. The control yoke of claim 31 including pilot control handle means connected to a top end of a second of said side legs.

33. The control yoke of claim 32 wherein said handle means comprises;

a second rigid, elongated, and generally horizontal yoke member rotatable about said generally horizontal axis, and having a first end connected to said top end of said second side leg, a rigid, elongated, T member connected to a second end of said second horizontal yoke member, said T member extending generally perpendicular to said axis, said T member having first and second ends located generally equal distances on opposites side of said axis, and first and second hand grips extending generally downward from said first and second ends respectively of said T member.

34. An aircraft control yoke extending outward from a generally vertical aircraft instrument panel, comprising;

an upward facing U-shaped yoke member having two horizontally spaced and vertically extending side legs having top ends and having bottom ends that are joined together by a bottom leg, first and second elongated guide slots formed in said side legs so as to place said guide slots in parallel facing relation to each other, a generally horizontal support table located within said U-shaped yoke portion, a guide rod carried by said support table, said guide rod having opposite ends thereof freely slidable in said first and second guide slots, extendable support means mounting said table to be supported by said instrument panel, an airbag mounted on said table, said airbag being subject to inflation as a function of an aircraft force, a two piece, horizontally extending yoke member rotatable about a generally horizontal axis to control aircraft roll and movable toward and away from said instrument panel to control aircraft pitch, a first piece of said two piece yoke member extending from said instrument panel, and a second piece of said two piece yoke member extending from said first piece to a top end of a first of said side members, said two piece yoke member having a normal relative position whereby said two piece yoke member is operable to effect control of both aircraft roll and aircraft angle of attack, force means operable as a function of airbag inflation to effect relative movement of said two pieces of said two piece yoke member to an extended length relative position, and said two piece yoke member being constructed to accommodate only aircraft roll control when in said extended position.

35. The control yoke of claim 34 including;

reset means operable to accommodate resetting of said two piece yoke member from said extended length relative position to said normal relative position.

36. The control yoke of claim 34 wherein said airbag is subjected to an inflation/deflation sequence of short time duration, wherein said force means is controlled as a function of said airbag inflation/deflation sequence, and including manual reset means operable to accommodate resetting of said two piece yoke member from said extended length relative position to said normal position subsequent to said airbag inflation/deflation event.

37. The control yoke of claim 34 wherein said force means comprises an ignitable source of gas that is operable to generate gas pressure that is operable to effect relative movement of said two pieces of said two piece yoke member to said extended length relative position, and including means for venting said gas pressure when said extended length relative position is achieved.

38. The control yoke of claim 37 including first locking means for locking said first and second pieces of said two piece yoke member in said normal position, and means for releasing said locking means and igniting said source of gas.

39. The control yoke of claim 38 including manual reset means operable to accommodate resetting of said two piece yoke member from said extended length relative position to a reset normal relative position, and second locking means for locking said first and second pieces of said two piece yoke member in said reset normal position.

40. The control yoke of claim 34 including first locking means for locking said first and second pieces of said two piece yoke member in said normal position, and means for releasing said locking means and operating said force means.

41. The control yoke of claim 40 including manual reset means operable to accommodate resetting of said two piece yoke member from said extended length relative position to a reset normal relative position, and second locking means for locking said first and second pieces of said two piece yoke member in said reset normal position.

42. The control yoke of claim 34 including pilot control handle means connected to a top end of a second of said side legs.

43. The control yoke of claim 42 wherein said handle means comprises;

a second rigid, elongated, and generally horizontal yoke member rotatable about said generally horizontal axis and having a first end connected to said top end of said second side leg, a rigid, elongated, T member connected to a second end of said second horizontal yoke member, said T member extending generally perpendicular to said axis, said T member having first and second ends located generally equal distances on opposites side of said axis, and first and second hand grips extending generally downward from said first and second ends respectively of said T member.

44. The control yoke of claim 34 wherein said extendable support means comprises;

a first and a second elongated, generally horizontal, generally parallel, and freely extendable support rods having first and second ends, said first ends of said support rods being mounted to said instrument panel, and said second ends of said support rods being mounted to said support table generally equidistant on opposites sides of said guide rod, said support rods extending generally parallel to said axis and to said guide rod.

45. The control yoke of claim 44 including pilot control handle means connected to a top end of a second of said side legs.

46. The control yoke of claim 45 wherein said handle means comprises;

a second rigid, elongated, and generally horizontal yoke member rotatable about said generally horizontal axis and having a first end connected to said top end of said second side leg, a rigid, elongated, T member connected to a second end of said second horizontal yoke member, said T member extending generally perpendicular to said axis, said T member having first and second ends located generally equal distances on opposites side of said axis, and first and second hand grips extending generally downward from said first and second ends respectively of said T member.

* * * * *